United States Patent [19]

Coleman et al.

[11] 3,736,503

[45] May 29, 1973

[54] MULTIPLE CONDUCTOR CONTINUITY AND SHORT CIRCUIT TESTING DEVICE

[75] Inventors: Kenneth W. Coleman; John R. Peltz; Clayton L. Stoldt, all of Warren, Pa.

[73] Assignee: GTE Sylvania Incorporated, Seneca Falls, N.Y.

[22] Filed: Oct. 4, 1971

[21] Appl. No.: 186,013

[52] U.S. Cl. .................................................. 324/51
[51] Int. Cl. .............................................. G01r 31/02
[58] Field of Search .......................... 324/51, 54, 73

[56] References Cited

UNITED STATES PATENTS

| | | | |
|---|---|---|---|
| 3,378,764 | 4/1968 | Peltz et al. ................................ | 324/51 |
| 2,920,818 | 1/1960 | Taylor et al. ........................ | 324/51 X |
| 2,610,229 | 9/1952 | Cranford ................................ | 324/51 |
| 3,170,115 | 2/1965 | Tabor ...................................... | 324/51 |
| 3,156,864 | 11/1964 | Shaw ................................... | 324/51 X |

*Primary Examiner*—Gerard R. Strecker
*Attorney*—Norman J. O'Malley et al.

[57] ABSTRACT

An electrical continuity and short circuit testing device adapted for checking pairs of electrical conductors each of which are insulatively oriented from each other. The device utilizes a plurality of transformers each having their primary windings electrically connected to a common power source and each of their secondary windings electrically connected to a pair of current flow indicators. These indicators are in turn each electrically connected to one of said electrical conductors. To provide various combinations for testing, at least one reversing switch is utilized, this switch electrically interconnected between the primary windings of one of the transformers and the common power source.

8 Claims, 3 Drawing Figures

INVENTORS
KENNETH W. COLEMAN,
JOHN R. PELTZ, &
CLAYTON L. STOLDT

BY Donald R. Castle
ATTORNEY

MULTIPLE CONDUCTOR CONTINUITY AND SHORT CIRCUIT TESTING DEVICE

BACKGROUND OF THE INVENTION

This invention relates to a continuity and short circuit testing device for checking pairs of electrical conductors, this device utilizing a number of transformers and current indicators. More particularly, this invention relates to a continuity and short circuit tester adapted to perform tests wherein a multitude of circuits may be tested simultaneously.

Electrical cables having a plurality of electrical conductors insulatively oriented one from another therein are in widespread use in today's electronic industry. Cables of this variety take various cross sectional forms, a few examples being flat, round, and oval, and are applicable to a wide variety of circuit arrangements. Consequently, there has been a need for a testing device which could check each of these conductors and indicate whether there is a short between any two or more conductors or whether a break in one or more of the conductors exists somewhere in the cable.

OBJECTS AND SUMMARY OF THE INVENTION

It is, therefore, an object of this invention to provide an electrical continuity and short circuit testing device for testing electrical cables having a plurality of electrical conductors located therein.

It is a further object of this invention to provide an operator of this device with a visual indication as to which conductor or conductors are short circuiting or contain a break.

A still further object of this invention is to provide a device which is relatively inexpensive and easy to operate.

In accordance with one aspect of this invention there is provided a continuity and short circuit testing device which simultaneously tests pairs of electrical conductors, each of these conductors insulatively oriented one from another. The device includes at least two transformers, each of these transformers having their primary windings electrically connected to a common power source and their secondary windings adapted for electrically connecting to the conductors to be tested. At least one reversing switch is used for electrically interconnecting between one of the transformers and the power source.

DETAILED DESCRIPTION OF THE PREFERRED EMBODIMENTS

For a better understanding of the present invention, together with other and further objects, advantages, and capabilities thereof, reference is made to the following disclosure and appended claims in connection with the above-described drawings.

Figure 1:
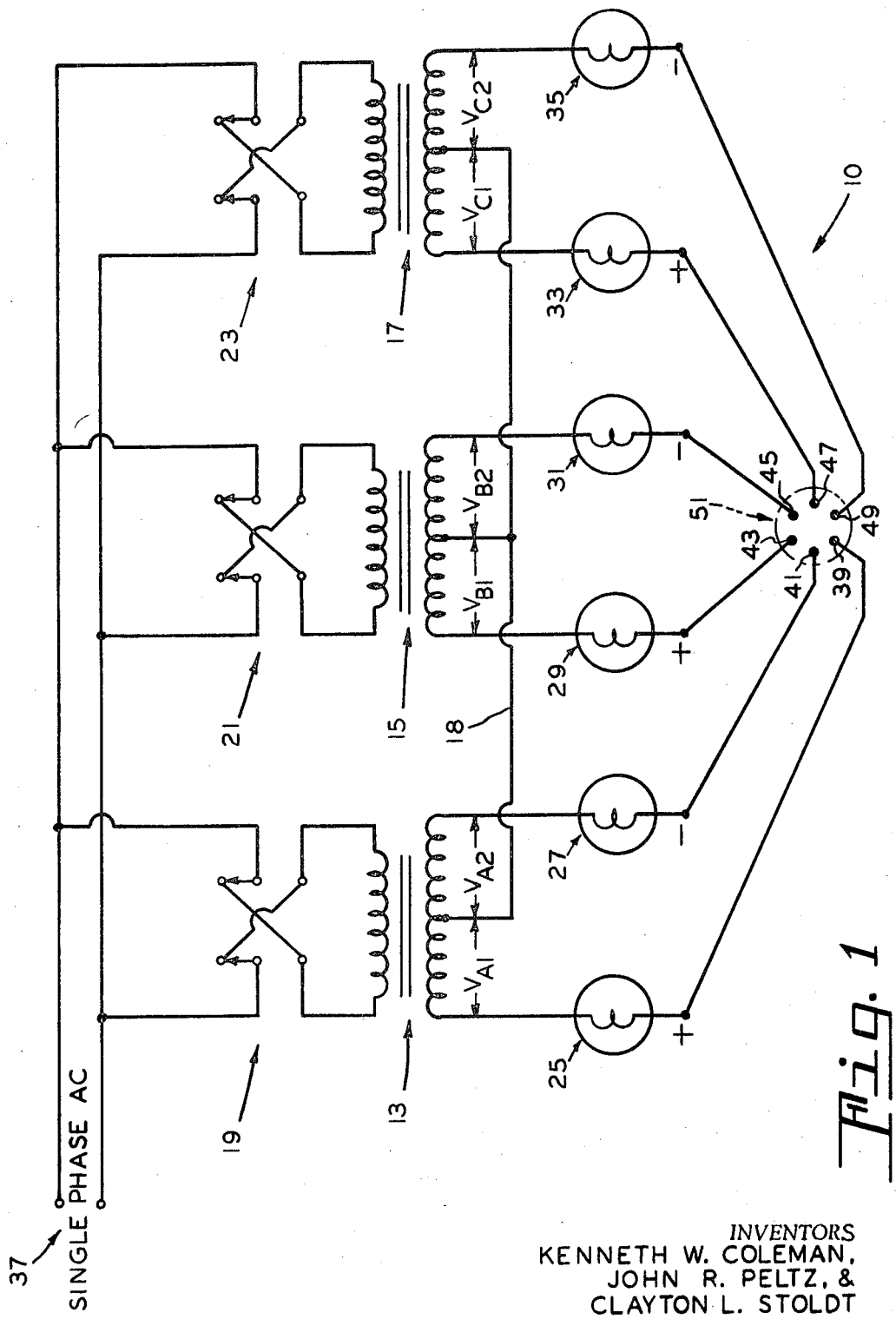
FIG. 1 is a schematic diagram of a testing device in accordance with one embodiment of the invention.

In FIG. 1 one embodiment of a testing device 10 in accordance with the invention is illustrated. Testing device 10, in general, includes a plurality of transformers each having a primary winding and a secondary winding, a power source adapted to be connected to the primary winding of each transformer, at least one reversing switch connected between the power source and one of the primary windings, and a plurality of current flow indicators connected to the secondary windings and adapted to be connected to conductors to be tested. In the specific embodiment illustrated, three transformers 13, 15, and 17, three reversing switches 19, 21, and 23, and six current flow indicators 25, 27, 29, 31, 33, and 35 are illustrated. The primary winding of each transformer is electrically connected to a respective reversing switch, whereas each secondary winding is electrically connected to a respective pair of indicators.

In the embodiment as shown, transformer 13 is connected to reversing switch 19 on its primary side and to current flow indicators 25 and 27 on its secondary side. In like manner, transformer 15 is connected to switch 21 and indicators 29 and 31, and transformer 17 is connected to switch 23 and indicators 33 and 35, respectively. Reversing switches 19, 21, and 23 are in turn electrically connected to a common power source, illustrated as a single phase AC source 37.

Device 10 can test cables including up to six electrical conductors. For example, conductors 39, 41, 43, 45, 47, 49 are shown positioned within cable 51 which has a substantially circular cross sectional area. Device 10 can also test conductors positioned within cables having different cross sectional areas, such as oval or flat. It is also capable of testing more than six conductors by the addition of more components similar to those of FIG. 1. For example, if the cable to be tested contains 10 conductors, it is only necessary to add two transformers, two reversing switches, and four current indicators to the circuit of device 10 and electrically arrange them in a manner similar to those components of device 10. This procedure can be continued to provide testing capabilities for an indefinite number of conductors, provided that for each pair of additional conductors, one transformer, one switch, and two indicators are added.

To test the six conductors of cable 51 for short circuiting (the leakage of current from one conductor to another), indicators 25, 27, 29, 31, 33, and 35 are electrically connected to conductors 39, 41, 43, 45, 47, and 49 respectively, and single phase AC source 37 is turned on. Assuming that transformers 13, 15, and 17 are similar, the corresponding voltages of the secondary portions of each transformer, indicated as $V_{A1}$ and $V_{A2}$ for transformer 13, $V_{B1}$ and $V_{B2}$ for transformer 15, and $V_{C1}$ and $V_{C2}$ for transformer 17, are all equal, the secondaries being equally divided by common center tap 18. The instantaneous polarities are shown on the connections to the individual conductors.

Assuming that source 37 has a voltage of 500 volts and each transformer is a 2:1 step-up type, $V_{A1} = V_{A2} = V_{B1} = V_{B2} = V_{C1} = V_{C2}$, all being equal to 500 volts. Or, in other words, with the polarities as indicated and switches in their shown positions, a total of 1,000 volts is impressed across conductors 39 and 41, 43 and 45, 47 and 49, 39 and 45, 39 and 49, 41 and 43, 41 and 47, 43 and 49, and 45 and 47. These pairs of conductors are, therefore, tested and constitute nine of the 15 possible combinations of pairs of conductors and tests necessary for checking a six conductor cable.

If a leakage (short) occurs between any pair, for example 39 and 41, the respective indicators, in this case 25 and 27, will be activated. This occurs because a complete electrical circuit exists in this portion of device 10 and current flows through indicators 25 and 27. The indicators can be any suitable current flow indicators such as lamps, as illustrated in FIG. 1, or other current sensitive devices. For example, ammeters which provide a reading to the device operator of the magnitude of current flow can be advantageously used in some applications of the invention. Preferably, the indicators provide a visual indication to the operator in order that he can quickly ascertain the conductors at fault.

To check cable 51 for the remaining possible test combinations, the operator reverses one of the reversing switches, for example, switch 19, and maintains switches 21 and 23 in their previous positions (as shown). Now 1,000 volts is impressed across conductors 39 and 43, 41 and 45, 39 and 47, and 41 and 49. Other combinations also receive this voltage, however, these combinations were previously tested when switch 19 was in its original position. With the addition of these four tests, 13 of the 15 test requirements have been satisfied. Upon completing a check of these new combinations and finding them satisfactory, the operator returns switch 19 to its original position (shown in FIG. 1) and reverses one of the remaining switches, for example, switch 21. The instantaneous polarities of conductors 43 and 45 are changed, the result being that now 1,000 volts is impressed across the remaining possible test combinations, 43 and 47, and 45 and 49.

If the testing procedure dictates that the previously described order of switching is to be maintained, it can be seen that reversing switch 23 is not necessary to the prescribed operation of device 10. Instead, the primary windings of transformer 17 can be directly connected to the power source and switch 23 can be eliminated. It should be noted, however, that the addition of switch 23 does allow a variety of testing procedures to be performed by device 10.

Figure 2:
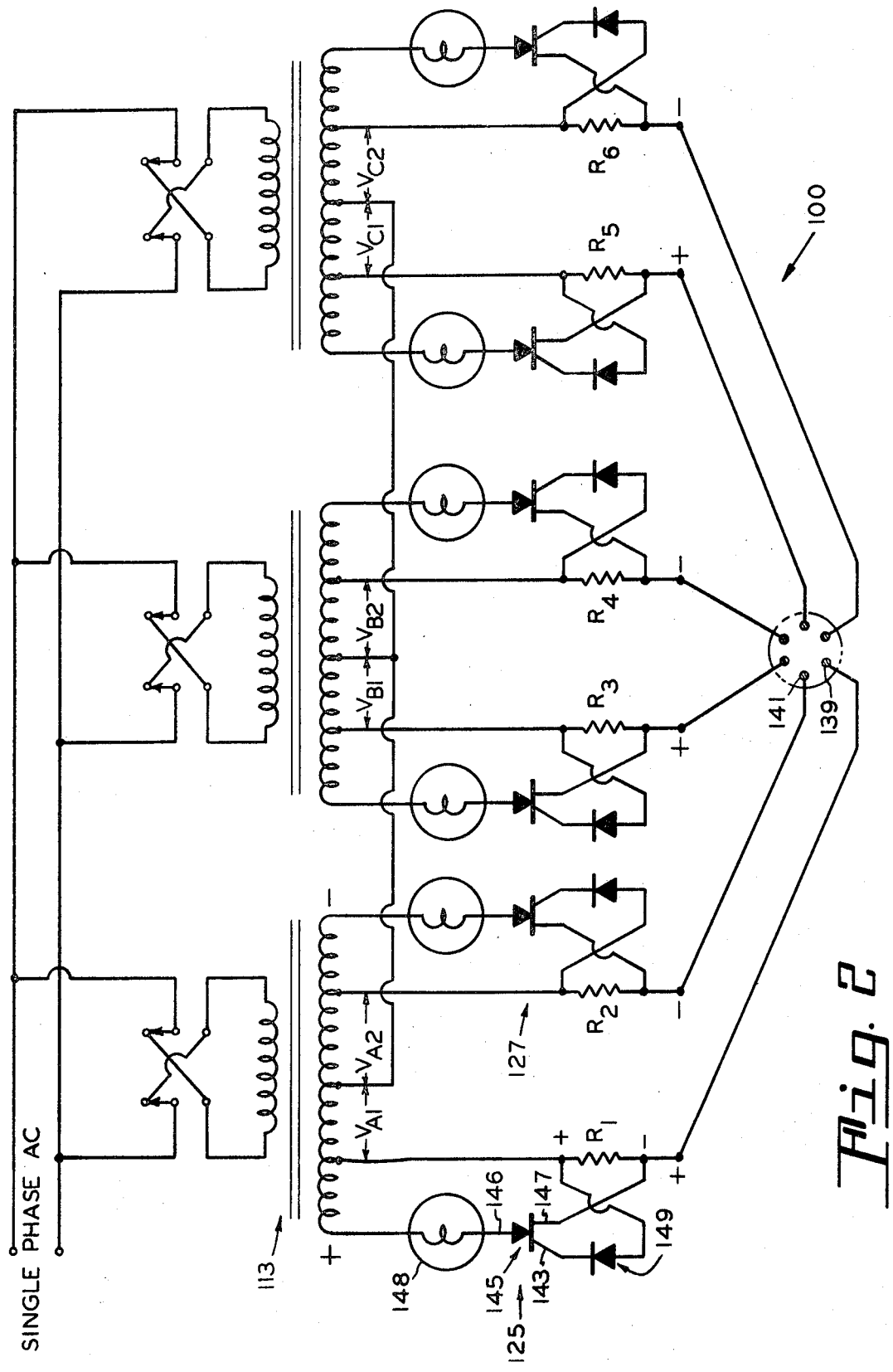
FIG. 2 is a schematic diagram of a testing device in accordance with the invention, illustrating a preferred form of current flow indicator.

In FIG. 2 there is shown an embodiment of the present invention, device 100 which is similar to that described in FIG. 1 with the exception that each of the current flow indicators comprises a sampling resistor, a diode, and a current control device, illustrated as a silicon controlled rectifier, in addition to a lamp (or ammeter) as previously described. Although a silicon controlled rectifier is illustrated as the preferred current control device, other similar type devices such as a thyratron, ignitron, vacuum tube or transistor could successfully be utilized. The basic testing procedure of device 100 is similar to that of device 10 and, therefore, only the operation of one pair of indicators of the device will be described. In this particular case, the operation of current indicators 125 and 127, electrically interconnected between the secondary windings of transformer 113 and conductors 139 and 141, respectively, will be explained.

Similar to the operation of device 10 in FIG. 1, when the three transformers are actuated, $V_{A1}=$ $V_{A2}=V_{B1}=V_{B2}=V_{C1}=V_{C2}$, all being equal to a predetermined value, for example, 500 volts. If current flows from conductor 139 to 141 during the first half cycle of AC operation (the positive side of the secondary being as indicated), the current across sampling resistor $R_1$ produces a voltage across this resistor having the polarities shown. The voltage across resistor $R_1$ is coupled between gate 143 and cathode 147 of a silicon controlled rectifier (SCR) 145 to cause SCR 145 to become conductive. Current thus flows from the secondary winding of transformer 113 through an indicating device illustrated as an electric lamp 148, through SCR 145 from anode 146 to cathode 147, and through resistor $R_1$, thereby energizing lamp 148. As was noted above, an ammeter or other suitable current indicating device can be substituted in place of the lamp, the result being a visible current indication.

During the second half cycle of the AC current flow, the polarities of the voltages across the secondary windings of transformer 113 are reversed and in the event of current leakage from conductor 141 to 139, current indicator 127 is actuated in a manner similar to that described for indicator 125. Diode 149, a current indicator 125, prevents reverse current flow through gate 143 of SCR 145.

Figure 3:
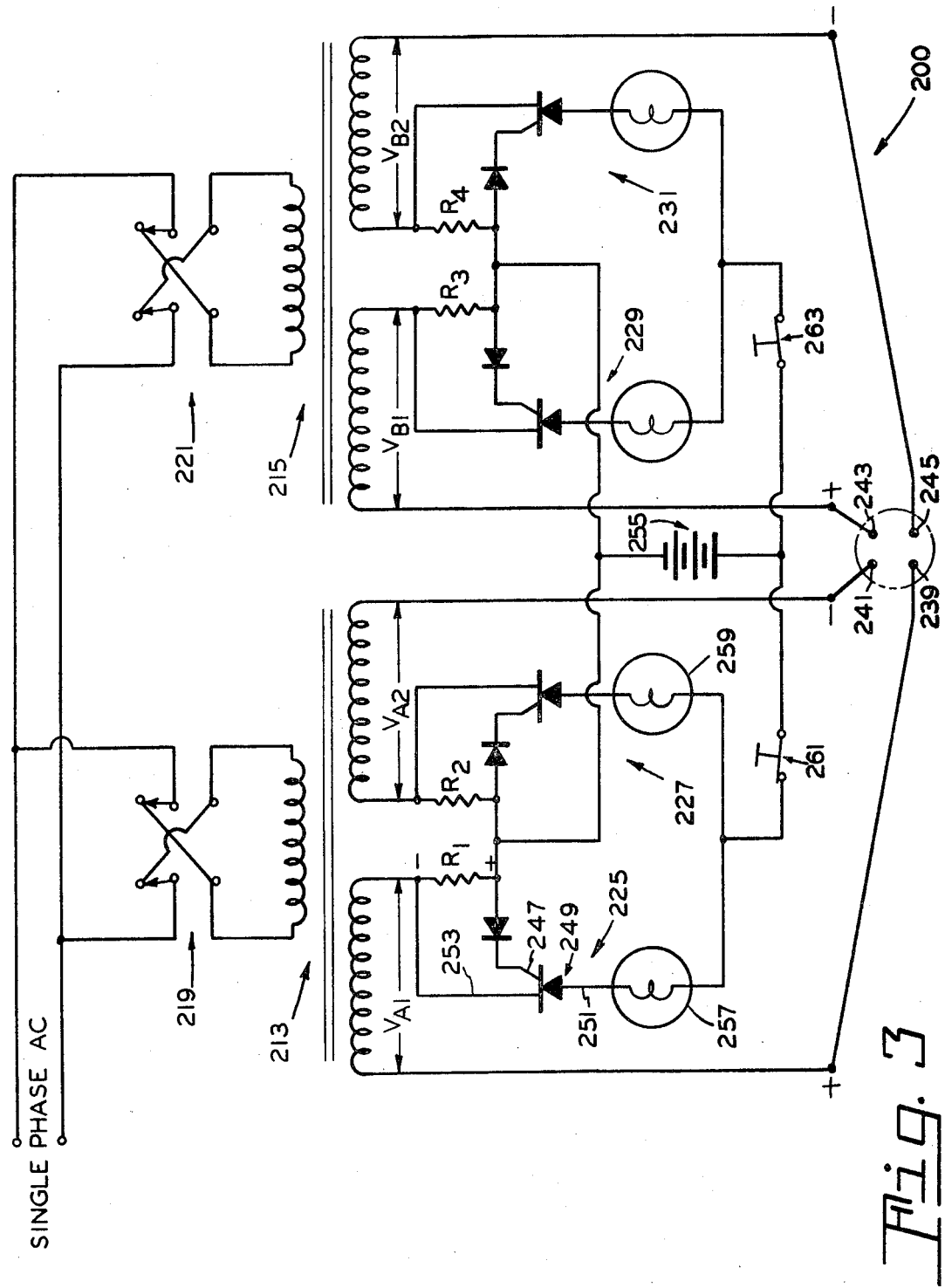
FIG. 3 is a schematic diagram of a testing device in accordance with the invention, illustrating an alternative preferred form of current flow indicator.

As in the operation of device 10 of FIG. 1, both lights will appear to be continuously lit if current leakage occurs between the respective conductors to which they are connected. However, in the embodiment of FIG. 2, each lamp will be energized once each cycle of the supply voltage and will be lit for a half cycle or less of the AC current flow. The net result of this may be that the lamps will lack in sufficient visible illumination. The embodiment of FIG. 3 overcomes this possible occurrence by providing a more positive indication of current flow. To simplify the description of FIG. 3, testing device 200 is shown as being adaptable for testing four conductors, 239, 241, 243, and 245. To accommodate for additional conductors, this relatively simple circuit arrangement can be altered by the addition of further similar components in much the same manner as was described for device 10 and 100 in FIGS. 1 and 2 respectively.

Device 200 comprises two transformers 213 and 215, two reversing switches 219 and 221, and four current flow indicators 225, 227, 229, and 231. As in devices 10 and 100 previously described, each transformer is provided with a corresponding reversing switch and two indicators.

With the transformers in operation, the resulting voltage across the secondaries designated as $V_{A1}$ and $V_{A2}$ for transformer 213, and $V_{B1}$ and $V_{B2}$ for transformer 215 are all equal to a predetermined value, for example, 500 volts. Assuming the resulting instantaneous polarities on the conductors as shown, 1000 volts is impressed across conductor pairs 239 and 241, 239 and 245, 241 and 243, and 243 and 245. With four conductors to be tested, the number of test combinations is six. To accomplish the remaining two tests, the operator reverses one of the reversing switches, whereupon 1,000 volts is impressed across conductor pairs 239 and 243, and 241 and 245. This entire procedure is substantially similar to that previously described in FIG. 1 and also applicable to FIG. 2.

With the voltages impressed across the pair to be checked, any possible current leakage is determined in the following manner. If leakage occurs between conductors 239 and 241 for example, current will flow during the positive phase (as shown) of the AC source from conductor 239 to 241, through resistors $R_2$ and $R_1$, respectively, and back to conductor 239, thereby completing a circuit. A voltage is thus developed across resistor $R_1$ with the polarities as shown which is coupled to the cathode 253 and gate 247 of SCR 249, to cause SCR 249 to become conductive. Thus, current flows from a DC source, illustrated as a battery 255, through lamp 257, SCR 249 from anode 251 to cathode 253, and resistor $R_1$. The current flowing through lamp 257 energizes the lamp. DC source 255 provides a continuous current supply, as opposed to the half cycle supply afforded by AC current in the previously described devices. The overall result is a more visible illumination provided by the lamp.

During the second half cycle of AC current flow to the secondary of transformer 213, the resulting polarities are reversed from those shown. This in turn actuates indicator 227 in much the same manner as previously described for actuating indicator 225. Once again, a continuous DC current is supplied to lamp 259 of indicator 227, providing a more visible illumination.

The DC current to each lamp is continuously provided regardless of the operation of the single phase AC power source of the device, even if this source is terminated. Reset switches 261 and 263 are interconnected between the source and corresponding pairs of indicators. After the operator has completed his visual check and determined whether or not any conductors are at fault, he simply opens both switches. Because indicator 229 and 231 operate in the same manner as indicators 225 and 227, this results in the elimination of DC current flow to these components. Prior to actuating the AC source for the next test, the operator simply has to close these switches. Once again it should be noted that although SCR's are illustrated as the preferred current control devices, other similar type devices such as transistors, vacuum tubes, thyratrons, or ignitrons could be used.

Continuity can also be determined by any of the aforementioned circuits by intentionally connecting together all of the conductors at the end of the cable remote from the testing device. This can be accomplished by immersing this end in a conducting medium, such as mercury, salt water, or a suitable electrolyte. Under these conditions, with the common power supplies energized, all of the respective indicators should be activated. If a break (lack of continuity) exists somewhere in the cable, the indicator to which it is connected will not be actuated, thereby allowing the device operator to easily trace the conductor or conductors at fault.

Thus, there have been shown several embodiments of a device for checking pairs of conductors located within electrical cables for short circuits and lack of continuity. Each of these embodiments employs a plurality of transformers, at least one reversing switch, and a plurality of current flow indicators, these components all being electrically connected to provide a device which is relatively inexpensive to manufacture and maintain, and one which requires a minimal amount of difficulty to operate.

While there have been shown and described what are presently considered the preferred embodiments of this invention, it is obvious to those skilled in the art that various changes and modifications may be made therein without departing from the scope of the invention as defined by the following claims.

We claim:

1. An electrical continuity and short circuit testing device for simultaneously checking pairs of electrical conductors, each of said conductors insulatively oriented one from another, said device comprising:
   a common power source;
   at least two transformers, each of said transformers having their primary windings electrically connected to said common power source and their secondary windings electrically connected to a pair of current flow indicators, each of said current flow indicators electrically connected to one of said electrical conductors; and at least one reversing switch electrically interconnected between one of said transformers and said common power source.

2. The electrical device according to claim 1 wherein said pairs of electrical conductors to be tested number at least three, and said device includes at least three transformers and at least two reversing switches, each of said switches electrically interconnected between one of said transformers and said common power source, one of said transformers thereby being directly connected to said power source.

3. The electrical device according to claim 1 in which said common power source is a single phase AC source.

4. The electrical device according to claim 1 wherein each of said current flow indicators comprises an electric lamp.

5. The electrical device according to claim 1 wherein each of said current flow indicators comprises a sampling resistor connected to a current control device to electrically activate an electric lamp in response to electrical current flowing through said resistor.

6. The electrical device according to claim 5 in which said current control device is a silicon controlled rectifier having a diode electrically connected thereto to prevent reverse current flow through said silicon controlled rectifier.

7. The device according to claim 6 wherein each of said current flow indicators is electrically connected to a DC source, said DC source providing a continuous DC current to said indicator when said silicon controlled rectifier is activated by electrical current flowing through said sampling resistor.

8. The device according to claim 7 in which a reset switch is electrically interconnected between said DC source and each of said current flow indicators, thereby providing a means whereby said DC current is terminated from said DC source.

* * * * *